May 12, 1964

V. S. NORTY 3,132,845

VIBRATORY MIXER

Filed Feb. 19, 1963

VLADIMIR S. NORTY
INVENTOR.

BY *Z. O. St. Palley*
Patent Agent

3,132,845
VIBRATORY MIXER
Vladimir S. Norty, 160 Dewitt St., New Haven, Conn.
Filed Feb. 19, 1963, Ser. No. 259,494
4 Claims. (Cl. 259—2)

My invention relates to mixers, and has particular utility in mixing materials of high viscosity.

One of the important objects of my invention is to provide an apparatus for the simultaneous mixing of two or more materials which utilizes mechanical vibrations imparted to these materials to counteract the effect of the viscosity thereby accomplishing the thorough and uniform mixing of these materials.

Another important object of my invention is to provide a power driven mixer of high output capacity for the simultaneous mixing of two or more materials of high viscosity which will operate satisfactorily both at continuous uniform output and at variable intermittent output.

A further important object of my invention is to provide a mixer which is reliable in operation, economical in manufacture and maintenance.

Other objects and advantages of my invention will be apparent during the course of the following description.

Figure 1:
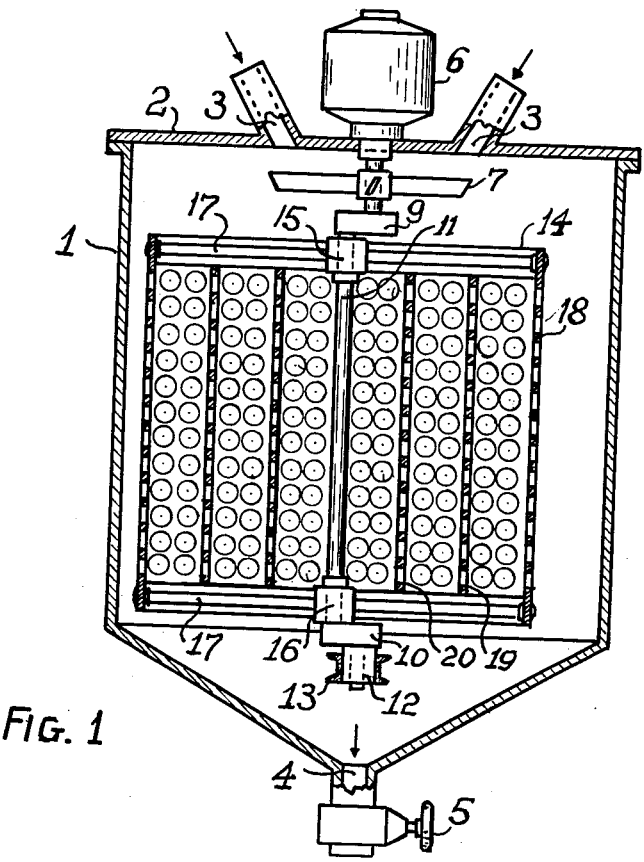
Figure 3:
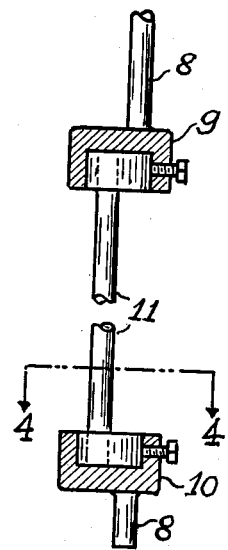
Figure 4:
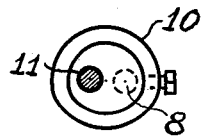
Figure 2:
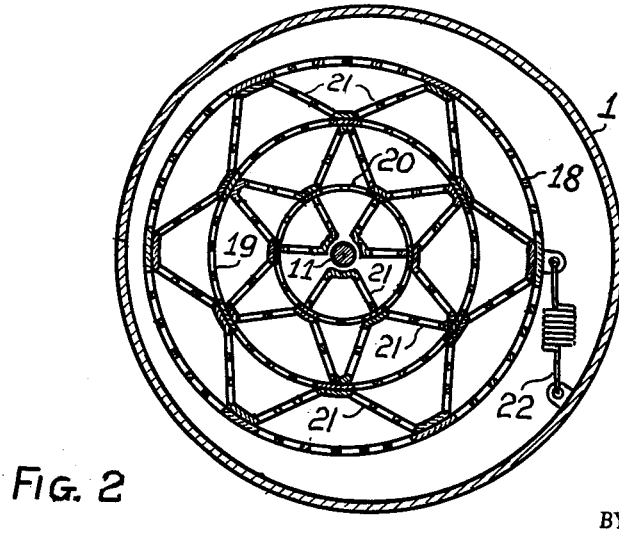

In the accompanying drawing, forming a part of the present application, wherein for the purpose of illustration is shown a preferred form of my invention, FIGURE 1 is a vertical sectional view of the preferred form of my mixer, FIGURE 2 is a horizontal sectional view of the same, FIGURE 3 is a side view of the crankshaft, FIGURE 4 is a plan view of the same.

Referring to the drawing, the numeral 1 designates the casing of the mixer which, in the form illustrated is cylindrical in shape with a conical bottom.

The top of the casing 1 is closed by a gasketed cover 2 which is provided with inlet openings 3 for the introduction of the materials to be mixed into the casing. The number of these inlet openings is determined by the number of the materials to be mixed. When the operation of the mixer is continuous it is usually required to have a separate inlet opening for each material to be mixed in the same operation.

For the discharge of the mixture the conical bottom of the casing 1 is provided with an outlet opening 4. The valve 5 serves to regulate the flow of the mixed materials and thereby determines the time allowed for the mixing of a given amount of materials and the output capacity of the machine.

Mounted on the cover 2 is an electric motor 6 having a vertical driving shaft extending into the casing 1. Secured to this driving shaft are the rotary mixing blades 7, the function of which is the preliminary mixing of the materials entering through the inlet openings 3. As shown in FIG. 1, the inlet openings 3 are located adjacent to the path of the mixing blades in order to enhance the effect of this preliminary mixing.

Connected to the end of the driving shaft of the motor 6 is the crank shaft 8, more detailed views of which are shown in FIGS. 3 and 4. The lower end of the crank shaft 8 is supported by the bearing 12, which rests on the supporting beams 13 attached to the casing 1. As illustrated in FIG. 3, the crank shaft 8 is composed of an upper and a lower central portion and an intermediate eccentric portion 11. These are connected by the eccentric heads 9 and 10. In the preferred form illustrated the heads 9 and 10 are composed of two parts which are rotatable relative to each other. In each of these heads 9 or 10 one part of the head is connected to the central portion 8 and the other part to the eccentric portion 11 in such a manner that, by the relative rotation of the two parts of the head the eccentricity of the crank shaft can be regulated.

An essential element of the present invention is the vibratory actuator 14, which is cylindrical in shape and is composed of a multiplicity of concentric cylinders having perforated walls. These cylinders, of which in the present form three are employed, marked 18, 19 and 20, are interconnected by a multiplicity of perforated sheets marked 21, forming a mechanically strong unit. The shape and size of these perforations may vary according to the viscosity of the materials to be mixed.

The vibratory actuator 14 is mounted on the eccentric portion 11 of the crank shaft 8 by means of the hubs 15 and 16, shown in FIG. 1. These hubs are connected to the outer perforated cylinder 18 by means of the spokes 17, and are located in the geometric axis of the cylinder 18. The hubs 15 and 16 are provided with proper bearings which permit the free rotation of the eccentric portion 11 within the hubs. The spokes 17 are designed to have sufficient mechanical strength to support the weight of the actuator 14 and also to transmit the radial forces produced by the rotating crank shaft.

Another important element of this apparatus is the spring 22, which connects a peripheral point of the vibratory actuator to a point of the casing. The object of this spring is to prevent the rotation of the actuator when the crank shaft is rotated, but to permit the vibratory motion or oscillation of the actuator produced by the rotation of the crank shaft.

This vibratory motion of the actuator, combined with its perforated surfaces, represents a novel mode of operation for mixing materials and results in such a thorough and uniform mixture which, for many materials cannot be accomplished by the customary methods.

The operation of my invention is as follows:

The materials to be mixed are introduced through the inlet opening, preferably in continuous streams, into the upper portion of the casing 1. Here, they meet the rotary blades 7 and receive a preliminary mixing. These materials may be liquids of high viscosity or may consist in addition of liquids also powders to be uniformly distributed in the liquids. Experience shows, that for many of these materials the rotary blades 7 can produce only a very superficial mixing, no matter how long they are applied. After this preliminary mixing the various materials group together in comparatively large lumps. However, when these lumps of material are impacted by the vibrating actuator and are forced through the perforations, they break up into microscopic particles and form a uniform mixture. It is an important advantage of the present invention that this mixing process can be made continuous by the proper regulation of the flow of the materials and the speed and eccentricity of the crank shaft.

It is to be understood that the form of my invention herein shown and described is only an example of the same, and that various changes in the shape, size and arrangement of parts may be made, without departing from the spirit of my invention or the scope of the subjoined claims.

I claim:

1. An apparatus for mixing materials comprising a casing having at its base an outlet opening and being enclosed by a cover having inlet openings; an electric motor mounted on said cover with its driving shaft extending into said casing; rotary mixing blades mounted on said driving shaft; a crank shaft rotatably mounted within said casing and operatively connected to said driving shaft, said crank shaft having an eccentric portion; a vibratory actuator mounted on the eccentric portion of said crank shaft so as to permit the rotation of said crank shaft, and being composed of concentric cylinders with perforated walls and perforated sheets interconnecting said cylinders; a spring, connecting said vibratory actuator with said casing, preventing the rotation of said vibratory actuator, but permitting its vibratory motion caused by the rotation of said crank shaft.

2. An apparatus for mixing materials comprising a closed casing having inlet openings for the introduction of the materials to be mixed, and outlet opening for the discharge of the mixed materials; motor drive means; rotary mixing blades mounted within said casing adjacent to said inlet openings and being operatively connected to said drive means; a crank shaft mounted within said casing, being rotatable by said drive means, and having an eccentric portion; a vibratory actuator mounted on said eccentric portion permitting relative rotation and comprising a multiplicity of perforated cylinders concentrically arranged and interconnected by a multiplicity of perforated sheets; a spring connecting said actuator with said casing preventing the rotation of the said actuator by said crank shaft.

3. An apparatus for mixing materials comprising a closed casing having inlet openings for the intake of the materials to be mixed and outlet opening for the discharge of the mixed materials; a power driven crank shaft rotatably mounted within said casing, and having an eccentric portion; a vibratory actuator mounted on the eccentric portion of said crank shaft by means of hubs permitting the free rotation of said crank shaft within said hubs, said actuator comprising a multiplicity of perforated walled cylinders interconnected by a multiplicity of perforated sheets; a spring connecting said actuator and said casing so as to prevent the rotation of said actuator, but permit its vibratory motion produced by the rotation of said crank shaft.

4. In an apparatus for mixing materials, having a closed casing with inlet and outlet openings, the combination comprising a crank shaft rotatably mounted within said casing, and having an eccentric portion; means for rotating said crank shaft; a vibratory actuator mounted on said eccentric portion of the crank shaft by means of rotation permitting hubs, comprising perforated walled cylinders interconnected by perforated sheets; resilient connection between said vibratory actuator and said casing preventing the rotation, but permitting the vibratory motion, of said actuator, caused by the rotation of said crank shaft.

References Cited in the file of this patent

UNITED STATES PATENTS

| 100,155 | Krandelt | Feb. 22, 1870 |
| 1,268,813 | Benjamins | June 11, 1918 |
| 3,041,050 | Nelson et al. | June 26, 1962 |

FOREIGN PATENTS

| 70,584 | Sweden | Oct. 15, 1927 |